Nov. 12, 1935.  J. A. NUGEN ET AL  2,020,851

LAWN MOWER

Filed Nov. 19, 1934

Inventors
John A. Nugen
William Burcke
by Rimsey & Kingsland
Their Attorneys.

Patented Nov. 12, 1935

2,020,851

UNITED STATES PATENT OFFICE 2,020,851

LAWN MOWER

John A. Nugen, Auburn, Ind., and William Burcke, Robertson, Mo.; said Burcke assignor to Roy C. Nugen, Indianapolis, Ind.

Application November 19, 1934, Serial No. 753,626

5 Claims. (Cl. 56—294)

This invention relates to lawn mowers, and has special reference to improvements in lawn mowers for raising destructive and obnoxious plants and weeds that creep along and lie close against the surface of the ground, so that they will be cut off close to their roots by the usual rotative reel blades of the usual lawn mowers; and an object of the invention is to provide a device for use in lawn mowers of familiar construction whereby the destructive and obnoxious plants and weeds will be raised and cut off and discharged by the lawn mower during the operation thereof in cutting or mowing the ornamental and other desirable grass growing on the lawn.

Specifically, this invention is an improvement over the subject matter disclosed in William Burcke Patent No. 1,935,013, granted November 14, 1933.

Other objects of the invention will appear from the following description, reference being made to the accompanying drawing, in which—

Figure 1:
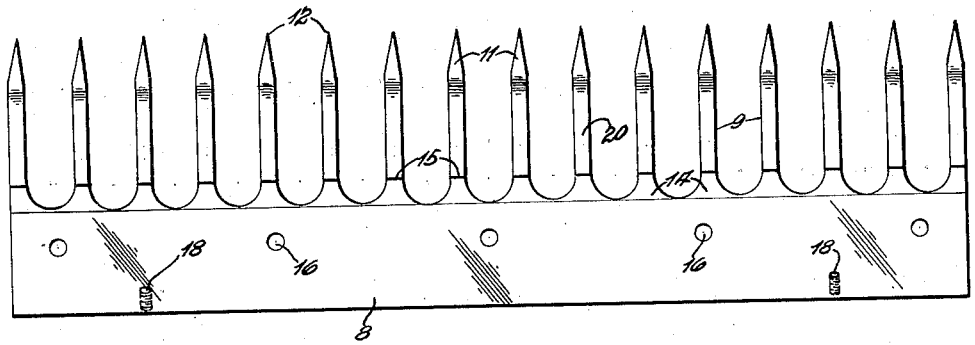
Fig. 1 is a plan view of that element of the present invention which raises and supports the obnoxious plants and weeds in position so that they will be cut off by the rotating reel blades.
Figure 2:
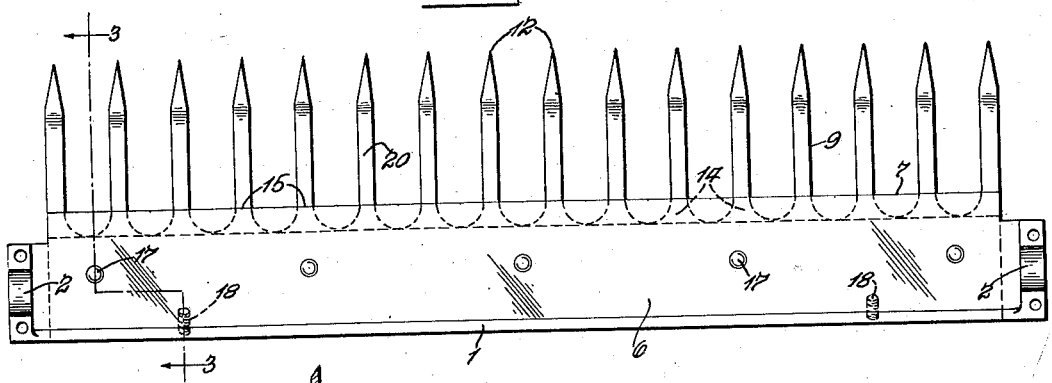
Fig. 2 is a plan view of the complete accessory connected with the stationary cutter with which the reel blades cooperate.

The usual supporting bar 1 of the lawn mower has end portions 2 provided for attaching the bar 1 rigidly to the frame (not shown) of the lawn mower. The lawn mower frame, as is well known, also supports a rotating shaft 3 having frame members 4 attached thereto and the reel cutting blades attached to said frame members 4.

The cutting bar 6 is attached to the supporting bar 1 and has its forwardly extended edge 7 arranged to constitute a shear edge to cooperate with the blades 5 during the rotation of the reel in which said blades 5 are mounted, in order to cut the grass and other vegetation.

Our present invention comprises a bar 8 having in connection with its forward edge a series of downwardly and forwardly extended fingers 9 provided at their forward ends with upwardly curved terminal portions 11 sharply pointed at their ends 12. The lower surface of each of the fingers 9 is provided with a rounded wall 13 running rearwardly from the point 12 so as to slide smoothly over and along the surface of the ground.

It has been found desirable or necessary to vary the angle of inclination of the fingers 9 with respect to the cutting bar 6 to obtain effective operation of the lawn mower in cutting different kinds of creeping grasses and vegetation. The provision of the upwardly curved ends 11 terminating in the sharp points 12 and provided with the rounded lower wall 13 permits proper variation in the angle of inclination of the fingers 9 to raise the different kinds of creeping grasses and vegetation without raising objectionable and damaging elements and substances, such as broken sticks and the like. The forward margin of the bar 8 and the rear ends of the fingers 9 are formed with a downwardly and forwardly inclined wall 14 terminating in a vertical wall 15 across the upper side of each finger 9 and against or adjacent to the forward cutting edge 7 of the cutter bar 6.

The bar 8 is formed with a series of holes 16 through which the stems of screws 17 pass, the heads of said screws 17 being against the underside of and supporting the bar 8, while the threaded ends of said stems extend through the cutter bar 6 and screw into the bar 1. Thus, the screws 17 will support the bar 8 and the cutter bar 6 in connection with the supporting bar 1.

The rear portion of the bar 8 is formed with a number of threaded holes 18 which are substantially rearwardly beyond the holes 16. A screw 19 is screwed into each of the holes 18, and the upper ends of said screws 19 press against the cutter bar 6.

Figures 3, 4:
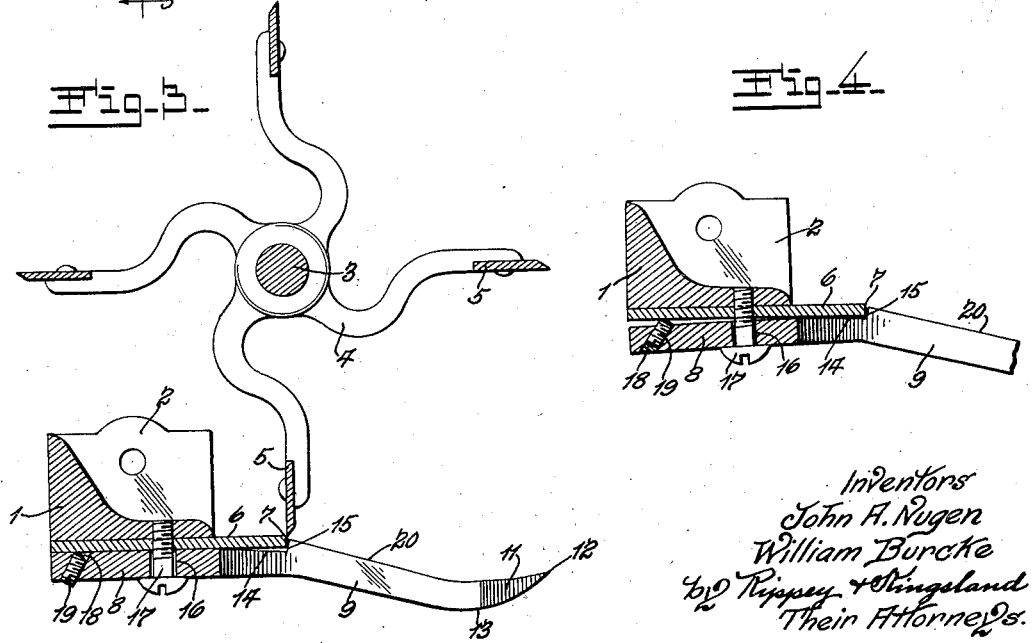
Fig. 3 is a cross-sectional view of the device on the line 3—3 of Fig. 2, a conventional form of rotating reel also being shown in section.
Fig. 4 is a sectional view similar to that shown in Fig. 3, the parts being shown in a different adjustment and the rotating reel being omitted.

By adjusting the screws 17 and 19 in the relationship shown in Fig. 3, in which the upper ends of the screws 19 do not extend above the upper surface of the bar 8 and in which relationship the screws 17 clamp said bar 8, the cutter bar 6 and the bar 1 in rigid relationship, the fingers 9 are supported in their lowest position; whereas, by releasing the screws 17 to the proper extent and screwing the screws 19 upwardly to the relationship shown in Fig. 4, the fingers 9 will be supported in a higher position. This variation in the angle of inclination of the fingers 9 is optional and said fingers may be adjusted in any desired angle of inclination from their extreme upper position to their extreme lower position.

Further, the relationship of the upper walls 20 to the sharp cutting edge 7 of the cutter bar 6 prevents the cut grass and vegetation from remaining across the fingers 9 and massing to such an extent as to choke or stop the lawn mower by preventing effective rotation of the reel of the cutting blades. It will be noted that the upper walls 20 in all adjustments of the fingers incline upwardly toward the sharp cutting edge 7, and that no substantial abutment is provided at the forward edge of the cutter plate that would hold and retain the cut vegetation. Therefore, the relationship of the upper walls 20 to the cutter bar 6 constitutes means for discharging the cut vegetation instead of retaining it.

The holes 16 are of sufficient size to permit the angular inclination of the bar 8 without bending the screws 17.

The construction and arrangement of the elements of this invention may be varied within the scope of equivalent limits.

We claim:—

1. In a lawn mower, a rigid bar, a cutter plate below and extending forwardly beyond the forward edge of said bar, a bar located adjacent to the underside of said cutter plate, screws engaging said rigid bar and supporting said second bar in said location, a series of fingers integral with and extending downwardly and forwardly from the forward edge of said second bar beyond the forward edge of said cutter plate and having pointed forward ends, and screws engaging said cutter plate and said second bar and cooperating with said first named screws to hold said second bar and thereby said fingers in different angles of inclination with respect to said cutter plate.

2. In a lawn mower, a rigid bar, a cutter plate below and extending forwardly beyond the forward edge of said bar, a bar located adjacent to the underside of said cutter plate, screws engaging said rigid bar and supporting said second bar in said location, a series of fingers integral with and extending downwardly and forwardly from the forward edge of said second bar beyond the forward edge of said cutter plate and having upwardly curved and pointed forward ends, and screws engaging said cutter plate and said second bar and cooperating with said first named screws to hold said second bar and thereby said fingers in different angles of inclination with respect to said cutter plate and also holding said cutter plate in rigid connection with said first named bar.

3. In a lawn mower, a rigid bar, a cutter plate below and extending forwardly beyond the forward edge of said bar, a bar located below said cutter plate, a series of fingers extending downwardly and forwardly from the forward edge of said second bar beyond the forward edge of said cutter plate and having upwardly curved and pointed forward ends, shoulders on said fingers adjacent to the forward edge of said cutter plate, supporting elements holding said cutter plate and said second bar in connection with said rigid bar, and screws engaging said cutter plate and said second bar and cooperating with said supporting elements holding said second bar and thereby said fingers in different angles of inclination with respect to said cutter plate and holding said cutter plate in rigid connection with said rigid bar.

4. In a lawn mower, a rigid bar, a cutter plate below and extending forwardly beyond the forward edge of said bar, a bar located below said cutter plate, a series of fingers extending forwardly from the forward edge of said second bar beyond the forward edge of said cutter plate and having upwardly curved and pointed forward ends provided with rounded under surfaces, screws for supporting said second bar in rigid relationship with respect to said cutter plate and said first bar, and screws supported by said second bar and engaging said cutter plate to hold said second bar and thereby said fingers in different angles of inclination with respect to said cutter plate.

5. In a lawn mower, a rigid bar, a cutter plate below and extending forwardly beyond the forward edge of said bar, a bar located adjacent to the underside of said cutter plate, a series of fingers extending forwardly from the forward edge of said second bar beyond the forward edge of said cutter plate and having shoulders adjacent to said forward edge of said cutter plate and also having rearwardly and upwardly inclined upper walls intersecting said shoulders, screws engaging said rigid bar and said second bar for supporting said second bar and thereby said cutter plate below said rigid bar, and screws for spacing apart the rear edges of said cutter plate and said second bar and cooperating with said first named screws to hold said fingers in different angles of inclination with respect to said cutter plate and also supporting said cutter plate and said second bar in connection with said rigid bar.

JOHN A. NUGEN.
WILLIAM BURCKE.